Figure 1:
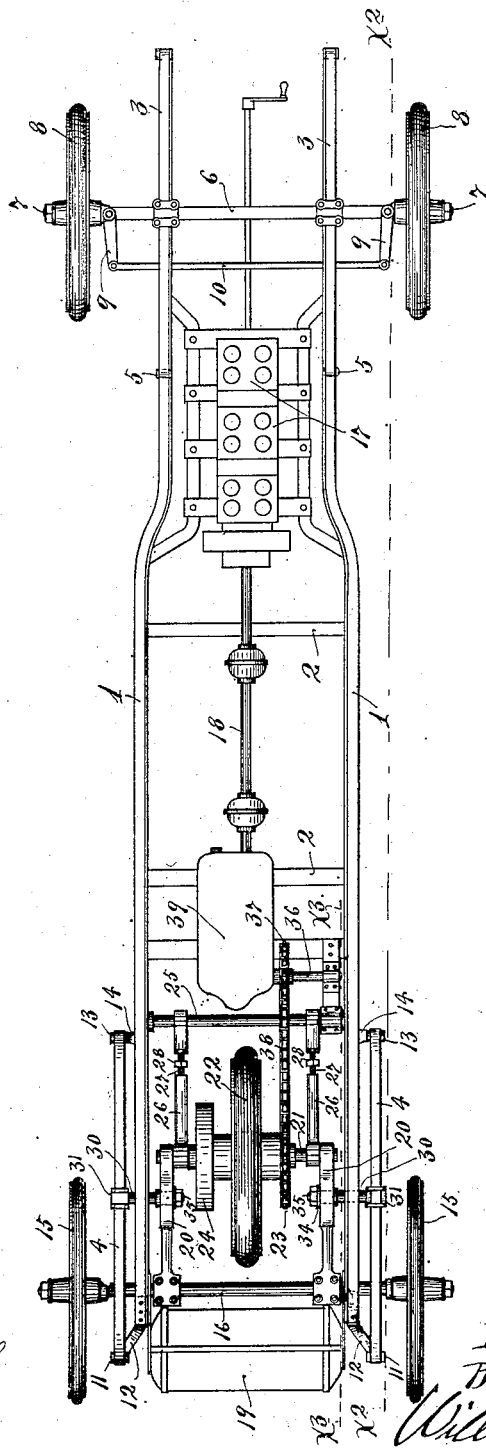

No. 880,076. PATENTED FEB. 25, 1908.
R. P. HICKS.
RUNNING GEAR FOR MOTOR DRIVEN VEHICLES.
APPLICATION FILED NOV. 21, 1906.

2 SHEETS—SHEET 1.

Witnesses.
A. H. Opsahl.
N. C. Kilgore.

Inventor
Rex Parker Hicks
By his Attorneys
Williamson & Merchant

No. 880,076. PATENTED FEB. 25, 1908.
R. P. HICKS.
RUNNING GEAR FOR MOTOR DRIVEN VEHICLES.
APPLICATION FILED NOV. 21, 1906.
2 SHEETS—SHEET 2.
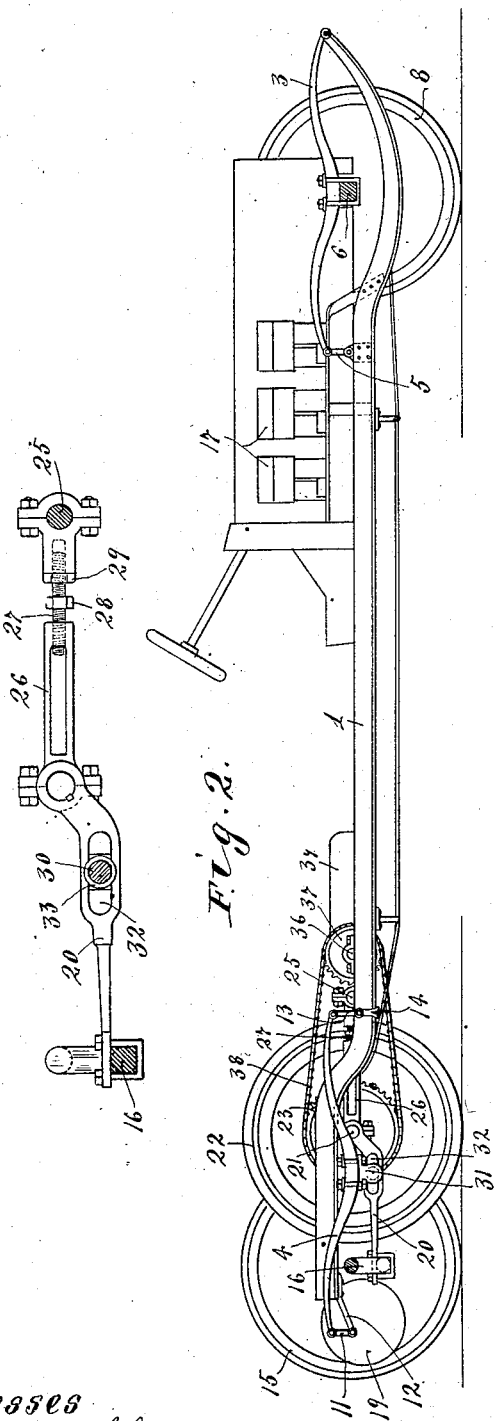
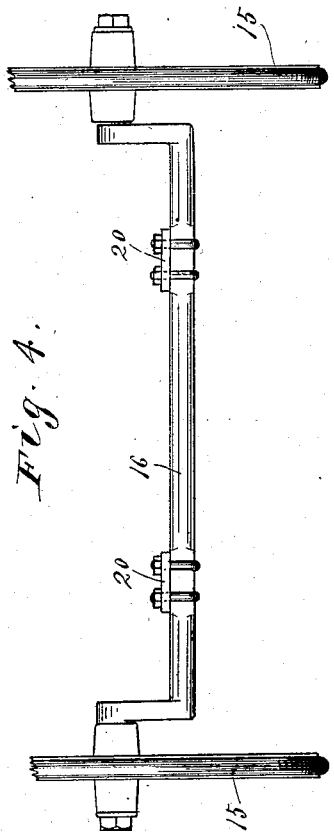
Witnesses
A. H. Opsahl.
H. D. Kilgore.
Inventor.
Rex Parker Hicks.
By his Attorneys.
Williamson & Merchant

UNITED STATES PATENT OFFICE.

REX PARKER HICKS, OF MINNEAPOLIS, MINNESOTA.

RUNNING-GEAR FOR MOTOR-DRIVEN VEHICLES.

No. 880,076.  Specification of Letters Patent.  Patented Feb. 25, 1908.

Application filed November 21, 1906. Serial No. 344,451.

*To all whom it may concern:*

Be it known that I, REX PARKER HICKS, a citizen of the United States, residing at Minneapolis, in the county of Hennepin and State of Minnesota, have invented certain new and useful Improvements in Running-Gear for Motor-Driven Vehicles; and I do hereby declare the following to be a full, clear, and exact description of the invention, such as will enable others skilled in the art to which it appertains to make and use the same.

My invention relates to running gear for vehicles which carry the motive power for their own propulsion, and has for its object to improve the same in the several particulars hereinafter noted.

Generally stated, this invention is in the nature of improvement in that type of running gear in which, in addition to the usual frame supporting wheels (of which there are usually four) a fifth or driving wheel proper is added, the connections between this said fifth or driving wheel and the rear wheels of the vehicle and the frame thereof being such that the weight of the load is carried partly by the said driving wheel and partly by the other wheels of the vehicle.

My invention is illustrated in the accompanying drawings, wherein like characters indicate like parts throughout the several views.

Referring to the drawings, Figure 1 is a plan view, showing the running gear of the vehicle in which my invention is incorporated. Fig. 2 is a view principally in side elevation, but with some parts sectioned on the line $x^2$ $x^2$ of Fig. 1. Fig. 3 is a detail in vertical section taken approximately on the line $x^3$ $x^3$ of Fig. 1, some parts being removed; and Fig. 4 is a rear elevation, showing the rear axle and rear wheels of the running gear, some parts being broken away.

The frame of the running gear is preferably made up of a pair of long laterally spaced angle bars 1 and a multiplicity of transverse tie bars 2. This frame-work, as shown, is designed to be supported through the intervention of elliptical front springs 3 and elliptical rear springs 4. The front springs 3, at their forward ends, are shown as pivotally connected to the front ends of the frame bars 1, and at their rear ends as connected to the said frame bars by short links 5. The front axle 6 is rigidly secured to the central portions of the said front springs 3 and at its ends is provided with the usual pivoted trunnions 7 on which the front wheels 8 are journaled in the usual way. Also, the said trunnions 7 are shown as provided with rearwardly extended arms 9 that are connected for parallel movements by a link 10 that constitutes part of the usual steering connection to the said front wheels.

The rear springs 4, at their rear ends, are shown as connected by short links 11 to brackets 12 rigidly secured to and constituting extensions of the frame bars 1. The front ends of said springs 4 are shown as connected by short links 13 to anchoring brackets 14 rigidly secured to the said frame bars 1. The rear wheels 15 are loosely journaled on the projecting ends of the rear axle 16, and the said axle is connected to the frame of said running gear by novel means hereinafter described. The said rear axle is shown as provided with a depressed intermediate portion, as best shown in Fig. 4, but this is done for convenience and is not an essential feature of this invention.

The numeral 17 indicates, diagrammatically, a multi-cylinder explosive engine rigidly supported by the forward portion of the frame-work and provided with a rearwardly extended driving shaft 18 mounted in suitable bearings on the said frame-work.

The numeral 19 indicates a gasolene or oil tank which, as shown, is suitably supported from the rear portion of the frame-work.

Those parts which relate particularly to my invention will now be described. Rigidly secured to the intermediate portion of the rear axle 16, preferably inward of the frame bars 1, are two forwardly projecting laterally spaced equalizing bars 20. A heavy spindle or transverse shaft 21 that extends parallel to the axle 16 is rigidly secured at its ends to the forward ends of said equalizing bars 20. On the intermediate portion of this spindle 21 is loosely journaled a fifth or additional wheel, to-wit, the traction or driving wheel 22. This wheel 22 is preferably heavier and stronger and has a larger tire than the wheels 8 and 15, and on its hub it is shown as provided with a sprocket wheel 23 and a brake drum 24.

Rigidly secured to the frame-work of the running gear in front of the driving wheel 22, is a support, preferably in the form of a heavy transverse rod 25.

The rear axle 16, the spindle 21 and the so-called "equalizing" bars 20 constitute a rigid frame, and together with the two rear wheels 15 and the driving wheel 22 constitute a tricycle. The forward portion of this tricycle frame is connected to the running gear frame with freedom for vertical movements and in such manner that the driving force from the traction wheel is transmitted to the main frame of the running gear. This is best accomplished by a pair of laterally spaced connecting links or bars 26 that are pivotally attached to the said shaft 21 and to the said transverse rod 25. The corresponding equalizing bars or levers 20 and connecting links or bars 26 make up a pair of toggle-acting connections that connect the rear axle to the vehicle frame with the traction or driving wheel 22 journaled at intermediate points of the said toggle connections. The rear axle is, therefore, free to move slightly forward and rearward with respect to the vehicle frame, as is required when the driving wheel or one or both of the rear wheels run over an obstruction or into a depression in the road bed.

The weight of the rear portion of the running gear frame and the load carried thereby is transmitted through the rear springs 4 to the so-called equalizing bars or levers 20 and through the latter is transmitted in downward pressure in part to the driving wheel 22 and in part to the rear wheels 15. Under vibratory movements of the running gear frame and parts carried thereby, with respect to the wheels and axles and the tricycle frame above noted, there is a tendency for said frame to sway or rock laterally, and very considerable force would be required to overcome this tendency and any connections attempting to prevent such lateral oscillatory movements would be subject to very great strains. For instance, if the so-called "connecting links" 26 be made rigid, they would be subjected to very great torsional strains, and something would have to spring or break unless, in fact, the said parts were made of impractical size and strength. I provide for this lateral oscillatory movement of the running gear frame with respect to the wheels, axles and tricycle frame or vice versa, by interposing swivel connections in the connecting links 26. These swivel connections are preferably formed by screw-threaded coupling rods 27 having right and left threads secured into the sections of the said links. The coupling rods 27, at their intermediate portions, are preferably provided with angular heads 28, by means of which they may be turned, and they are each provided with a lock nut 29 by means of which each bolt may be rigidly locked to one of the sections of the said links. With this arrangement, each coupling rod 27 is free to rotate or move with the swivel connection in one of the sections of the link in which it is incorporated. Otherwise stated, the two sections of the links are free for swivel or rotary movement under torsional strain. Also, the said threaded coupling rod 27 affords means for properly adjusting the length of the coupling links 26. This connection between the said springs 4 and the intermediate portions of the equalizing bars or levers 20 is preferably made by means of heavy studs 30 that are rigidly but adjustably secured at their inner ends to the respective equalizing bars 20, and at their outer ends are connected to brackets 31 that are rigidly secured to the intermediate portions of the said rear springs 4. To provide for the adjustment of the studs 30 with respect to the equalizing bars 20, said bars are formed with longitudinal slots 32, and said studs are provided with annular clamping flanges 33, the loose clamping washers 34 and nuts 35. The inner ends of the said studs project through said slots, and when the nuts 25 are tightened, the clamping flanges 33 and washers 34 are tightly clamped against the respective equalizing bars 20, thereby rigidly securing the said studs in whatever position they may be set.

Mounted in suitable bearings on the running gear frame, is a short transverse shaft 36 that carries a sprocket wheel 37. A sprocket chain 38 runs over the sprocket wheels 37 and 23 to impart motion from the shaft 36 to the driving wheel 22. The shaft 36 is driven from the shaft 18 through any suitable connections (not shown) such, for instance, as the usual reversible variable speed tire transmission mechanism which may be assumed to be located within the casing 39, diagrammatically illustrated in Fig. 1, and shown as supported by two of the cross bars 2 of the running gear frame.

Attention has already been called to the fact that by the construction described, part of the weight of the rear portion of the load may be carried by the driving wheel 22 and a part thereof by the rear wheels 15, and it is, of course, evident that by adjusting the spring connecting studs 30 to the equalizing bars or levers 20 at different points longitudinally thereof, the proportions of the load which will be carried by the driving wheel 22 and by the rear wheels 15, may be varied so as to give the proper traction or frictional contact between the said driving wheel and the road bed. The links 11 and 13 which connect the rear springs 4 to the main frame, permit a considerable variation in the positions of the connecting studs 30 with respect to the equalizing bars 20.

In running over an obstruction or over a depression in the road bed, the driving wheel and the rear wheels of the vehicle passes over the same in succession or at different times, so that the equalizing levers 20 are given a rocking movement which raises or lowers the spring connecting studs 30 to a vertical distance which is very materially less that the vertical movement made by said wheels, so that the vibration thereby imparted to the rear springs 4 and through said springs to the main frame and parts carried thereby, is minimized or greatly reduced. Hence it is that in practice it has been found that a machine designed on this plan, when equipped with solid rubber tires will run as smoothly or smoother, that is, free from vibrations, when running over rough roads, as a machine equipped with the ordinary pneumatic tires. Pneumatic tires, as is well known, are expensive to maintain and, hence, there is a decided advantage in point of economy in the use of solid rubber or other hard tires.

It will be noted that the links 26 are so disposed that their projected axes approximately intersect the axis of the sprocket-equipped shaft 36. Hence, such upward and downward movements as will be imparted to the driving wheel 22 incident to service on rough roads, will not materially change the tension of the driving chain 38.

The equalizing bars 20, rear axle 16 and spindle 21 have hitherto been referred to as constituting a rigid tricycle frame. These parts really constitute a frame which is independent of but supplemental to the main frame of the running gear. The expression "supplemental frame" is, therefore, used in a board sense. The expression "main frame" is also used in a broad sense and might include more or less of the body portion of the vehicle. It is, of course, obvious that so far as this invention is concerned, any suitable motive power may be employed.

What I claim is:

1. In a running gear of the kind described, the combination with a main frame and a supplemental frame, of rear wheels journaled to said supplemental frame, a driving wheel journaled to said supplemental frame between and forward of said rear wheels, resilient main frame supporting connections applied to said supplemental frame longitudinally intermediate of the axes of said driving wheel and of said rear wheels, and connections between said main and supplemental frames for causing the same to travel together, substantially as described.

2. In a running gear of the kind described, the combination with a main frame and a supplemental frame, of front wheels connected to the forward portion of said main frame, rear wheels journaled to the rear portion of said supplemental frame, a driving wheel journaled to the forward portion of said supplemental frame and located transversely between said rear wheels, springs connected to said supplemental frame longitudinally intermediate of the axes of said driving wheel and of said rear wheels and supporting the rear portion of said main frame, links connecting the forward portion of said supplemental frame to a more forward portion of said main frame, and means for rotating said driving wheel, substantially as described.

3. In a running gear of the kind described, the combination with a main frame and front wheels connected to the forward portion thereof, of a rear axle, laterally spaced equalizing bars and transverse spindle, said parts being rigidly connected and constituting a rigid supplemental frame, wheels journaled on the ends of said rear axle, a driving wheel journaled on said spindle, main frame supporting connections applied to the intermediate portions of said equalizing bars, links connecting the forward portion of said rigid supplemental frame to the more forward portion of said main frame, and means for rotating said driving wheel, substantially as described.

4. In a running gear of the kind described, the combination with a main frame and front wheels connected to the forward portion thereof, of a rigid supplemental frame, rear wheels journaled to the rear portion of said supplemental frame, a driving wheel journaled to the forward portion of said supplemental frame and located transversely between said rear wheels, main frame supporting connections applied to said supplemental frame longitudinally intermediate of the axes of said driving wheel and of said rear wheels, and torsionally yielding links connecting the forward portions of said supplemental frame to a more forward portion of said main frame, substantially as described.

5. In a running gear of the kind described, the combination with a main frame having suitable wheel support at its forward portion, of a supplemental frame, rear wheels and a driving wheel journaled to said supplemental frame with the said driving wheel located transversely between said rear wheels and axially out of line therewith, and swiveled links connecting said supplemental frame to said main frame, substantially as described.

6. In a running gear of the kind described, the combination with a main frame having suitable wheel support at its forward portion, of a rear axle, laterally spaced equalizing bars and forwardly located spindle, which parts are rigidly united and constitute a rigid supplemental frame, of rear wheels journaled on said rear axle, a driving wheel journaled on said spindle, main frame supporting connections applied to the intermediate portion of said equalizing bars, and links connecting the forward portion of said supplemental frame to a more forward portion of said main frame, said links having swivel-acting connections interposed therein, substantially as described.

7. In a running gear of the kind described, the combination with a main frame having suitable wheel support at its forward portion, of a rigid supplemental frame, rear wheels journaled to said supplemental frame, a driving wheel also journaled to said supplemental frame but located transversely between said rear wheels and axially out of line therewith, supporting connections between said main frame and supplemental frame, and links connecting said supplemental frame to said main frame, said links having swivel-acting connections interposed therein, substantially as described.

8. In a running gear of the kind described, the combination with a main frame having suitable wheel support at its forward portion, of a supplemental frame, rear wheels journaled to said supplemental frame, a driving wheel also journaled to said supplemental frame and located transversely between said rear wheels and axially out of line therewith, main frame supporting connections adjustably applied to said supplemental frame longitudinally intermediate of the axes of said driving wheel and of said rear wheels, and connections between said supplemental and main frame for causing the same to travel together, substantially as described.

9. In a running gear of the kind described, the combination with a main frame having suitable wheel support at its forward portion, of a supplemental frame, rear wheels journaled to said supplemental frame, a driving wheel also journaled to said supplemental frame but located transversely between said rear wheels and out of axial alinement therewith, rear springs attached to said main frame with freedom for movements longitudinally thereof, and spring supporting connections adjustably applied to said supplemental frame longitudinally intermediate of the axes of said driving wheel and of said rear wheels, and connections for causing said supplemental and main frames to travel together, substantially as described.

In testimony whereof I affix my signature in presence of two witnesses.

REX PARKER HICKS.

Witnesses:
MALIE HOEL,
F. D. MERCHANT.